US010021617B2

(12) United States Patent
Kim et al.

(10) Patent No.: US 10,021,617 B2
(45) Date of Patent: Jul. 10, 2018

(54) METHOD AND APPARATUS FOR PERFORMING, BY TERMINAL IN WLAN INTERWORKING OPERATION, HANDOVER

(71) Applicant: LG ELECTRONICS INC., Seoul (KR)

(72) Inventors: Sangwon Kim, Seoul (KR); Youngdae Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/475,868

(22) Filed: Mar. 31, 2017

(65) Prior Publication Data

US 2017/0289873 A1  Oct. 5, 2017

Related U.S. Application Data

(60) Provisional application No. 62/316,641, filed on Apr. 1, 2016.

(51) Int. Cl.
*H04W 36/28* (2009.01)
*H04W 76/19* (2018.01)
*H04W 88/06* (2009.01)
*H04W 84/12* (2009.01)

(52) U.S. Cl.
CPC ............ *H04W 36/28* (2013.01); *H04W 76/19* (2018.02); *H04W 84/12* (2013.01); *H04W 88/06* (2013.01)

(58) Field of Classification Search
CPC ... H04W 36/06; H04W 76/046; H04W 84/12; H04J 11/00
See application file for complete search history.

(56) References Cited

U.S. PATENT DOCUMENTS

| 2010/0056160 | A1* | 3/2010 | Kim | H04W 36/0055 |
| | | | | 455/444 |
| 2012/0115459 | A1* | 5/2012 | Deng | H04W 36/0094 |
| | | | | 455/422.1 |
| 2014/0199996 | A1* | 7/2014 | Wang | H04W 36/14 |
| | | | | 455/426.1 |
| 2015/0078153 | A1* | 3/2015 | Kuo | H04W 28/08 |
| | | | | 370/230 |
| 2015/0109927 | A1* | 4/2015 | Ozturk | H04W 36/0027 |
| | | | | 370/235 |
| 2015/0327117 | A1* | 11/2015 | Sirotkin | H04W 28/08 |
| | | | | 370/235 |

(Continued)

*Primary Examiner* — Brandon J Miller
(74) *Attorney, Agent, or Firm* — Lee Hong Degerman Kang & Waimey

(57) ABSTRACT

Provides are a method for performing, by a terminal in a WLAN interworking operation, handover in a wireless communication system and an apparatus supporting the same. The terminal may be instructed to perform handover from a source cell to a target cell, but may receive a handover command including a WLAN interworking configuration indication to indicate that the terminal maintains or releases a WLAN interworking configuration for a WLAN being accessed by the terminal. The terminal may attempt to perform the handover to the target cell in the state in which the terminal has maintained the WLAN interworking configuration if the WLAN interworking configuration indication indicates that the terminal maintains the WLAN interworking configuration.

14 Claims, 10 Drawing Sheets

(56) References Cited

U.S. PATENT DOCUMENTS

2015/0365872 A1* 12/2015 Dudda .............. H04W 36/0055
455/436
2016/0057680 A1* 2/2016 Koskinen .............. H04W 36/22
370/338
2016/0345334 A1* 11/2016 Veerepalli ......... H04W 72/0493

* cited by examiner (a)

(b)

METHOD AND APPARATUS FOR PERFORMING, BY TERMINAL IN WLAN INTERWORKING OPERATION, HANDOVER

CROSS-REFERENCE TO RELATED APPLICATIONS

Pursuant to 35 U.S.C. § 119(e), this application claims the benefit of U.S. Provisional Patent Application No. 62/316,641, filed on Apr. 1, 2016, the contents of which are hereby incorporated by reference herein in its entirety.

BACKGROUND OF THE INVENTION

Field of the Invention

The present invention relates to a wireless communication system, and more particularly, to a method for performing, by a terminal in a WLAN interworking operation, handover in a wireless communication system and an apparatus supporting the same.

Related Art

3rd generation partnership project (3GPP) long term evolution (LTE) is an improved version of the universal mobile telecommunication system (UMTS) and is introduced as the 3GPP Release 8. 3GPP LTE uses orthogonal frequency division multiple access (OFDMA) in downlink, and uses single carrier-frequency division multiple access (SC-FDMA) in uplink. 3GPP LTE uses multiple input multiple output (MIMO) having a maximum of four antennas. 3GPP LTE adopts multiple input multiple output (MIMO) having a maximum of four antennas. In recent years, there is an ongoing discussion on 3GPP LTE-advanced (LTE-A) that is an evolution of 3GPP LTE.

A wireless communication system may support providing a service over a plurality of access networks to a terminal. The terminal may receive the service over a 3GPP-based access network, such as a mobile wireless communication system, and further receive a service from a non-3GPP-based access network, such as worldwide interoperability for microwave access (WiMAX) or a wireless local area network (WLAN).

In general, the terminal may receive the service by establishing a connection with the 3GPP-based access network. When traffic overload occurs in the 3GPP-based access network, processing traffic to be processed by the terminal over another access network, that is, a non-3GPP-based access network, may improve overall efficiency of the network. To variably process traffic over the 3GPP-based access network and/or the non-3GPP-based access network is referred to as "traffic steering."

A policy for interlocking a 3GPP-based access network and a non-3GPP-based access network, such as access network discovery and selection functions (ANDSF), may be configured in a terminal for traffic steering. The policy is managed separately from an interlocking policy configured by a network.

An LTE-WLAN aggregation (LWA) is a technology which enables a single terminal to use LTE and Wi-Fi by interlocking LTE and Wi-Fi. In 3GPP, Release 13, LWA has been defined as a standard technology. In Release 14, an enhanced LWA (eLWA) has been defined. In an LWA configuration, a terminal may configure the radio resources of LTE and a WLAN by the configuration of a network without changing its hardware so that the LTE and a WLAN are used at the same time. Furthermore, 3GPP is a technology in which LTE and Wi-Fi can be interlocked and used, and additionally defines RCLWI and LWIP.

SUMMARY OF THE INVENTION

When a terminal receives a command to perform handover from a cell during a WLAN interworking operation, the terminal has been configured to release an LWA interworking configuration. For example, the terminal may attempt a connection with a new eNB in response to a handover command while it uses the radio resources of LTE and a WLAN and thus may release a connection with an existing WLAN. In such a case, the terminal has to newly attempt a connection with the WLAN in order to perform WLAN interworking after the handover. In order to obviate such an unnecessary operation, there is a need to not release a connection with a WLAN upon performing handover. Furthermore, in such a case, a terminal needs to report an access state with the WLAN after the handover, state information about whether WLAN access is normally maintained, to a network.

In accordance with an embodiment, there is provided a method for performing, by a terminal in a WLAN interworking operation, a handover procedure in a wireless communication system, including receiving a handover command which commands the terminal to perform handover from a source cell to a target cell and which includes a WLAN interworking configuration indication to indicate that the terminal maintains or releases a WLAN interworking configuration for a WLAN being accessed by the terminal and attempting to perform the handover to the target cell in the state in which the terminal has maintained the WLAN interworking configuration if the WLAN interworking configuration indication indicates that the terminal maintains the WLAN interworking configuration.

The WLAN interworking configuration may include any one of an LTE-WLAN aggregation (LWA) configuration, an RAN controlled LTE-WLAN interworking (RCLWI) configuration, and an LTE/WLAN radio level integration with IPsec tunnel (LWIP) configuration.

The method may further include searching for a cell for RRC connection re-establishment if the handover fails.

The method may further include performing an RRC connection re-establishment procedure on the retrieved cell searched for in the state in which the terminal has maintained the WLAN interworking configuration if, as a result of the search for the cell for RRC connection re-establishment, the retrieved cell is the source cell or the target cell.

The method may further include releasing the WLAN interworking configuration and initializing an RRC setup procedure if, as a result of the search for the cell, the retrieved cell is not the source cell or the target cell.

The method may further include reporting a WLAN connection status including whether the WLAN interworking configuration has been maintained to the target cell after the handover is performed.

The method may further include newly receiving WLAN interworking configuration information from the target cell if the WLAN connection status indicates that the WLAN interworking configuration has been released in the handover process.

Attempting to perform the handover may include attempting to perform the handover to the target cell in the state in which the WLAN interworking configuration has been released if the WLAN interworking configuration indication indicates that the WLAN interworking configuration is maintained.

In accordance with another embodiment, there is provided a terminal for performing a handover procedure during a WLAN interworking operation in a wireless communication system, including memory, a transceiver, and a processor connecting the memory and the transceiver. The processor is configured to perform control so that the terminal receives a handover command which commands the terminal to perform handover from a source cell to a target cell and which includes a WLAN interworking configuration indication to indicate that the terminal maintains or releases a WLAN interworking configuration for a WLAN being accessed by the terminal and that the terminal attempts to perform the handover to the target cell in the state in which the terminal has maintained the WLAN interworking configuration if the WLAN interworking configuration indication indicates that the terminal maintains the WLAN interworking configuration.

A terminal can maintain a connection with an existing WLAN even after handover. Accordingly, it is not necessary to perform an operation for newly accessing a WLAN and the offloading gain of a WLAN can be improved.

DESCRIPTION OF EXEMPLARY EMBODIMENTS

The technology described below may be used in various wireless communication systems, such as code division multiple access (CDMA), frequency division multiple access (FDMA), time division multiple access (TDMA), orthogonal frequency division multiple access (OFDMA) and single carrier frequency division multiple access (SC-FDMA). CDMA may be implemented with a radio technology such as universal terrestrial radio access (UTRA) or CDMA-2000. TDMA may be implemented with a radio technology such as global system for mobile communications (GSM)/general packet ratio service (GPRS)/enhanced data rate for GSM evolution (EDGE). OFDMA may be implemented with a radio technology, such as the institute of electrical and electronics engineers (IEEE) 802.11 (Wi-Fi), IEEE 802.16 (WiMAX), IEEE 802.20 or evolved UTRA (E-UTRA). IEEE 802.16m is evolved from IEEE 802.16e, and provides backward compatibility with a system based on the IEEE 802.16e. UTRA is a part of a universal mobile telecommunication system (UMTS). 3rd generation partnership project (3GPP) long term evolution (LTE) is a part of an evolved UMTS (E-UMTS) using E-UTRA. The 3GPP LTE uses OFDMA in a downlink and uses SC-FDMA in an uplink. LTE-advanced (LTE-A) is an evolution of LTE.

For clarity, the following description will focus on LTE-A. However, technical features of the present invention are not limited thereto.

Figure 1:
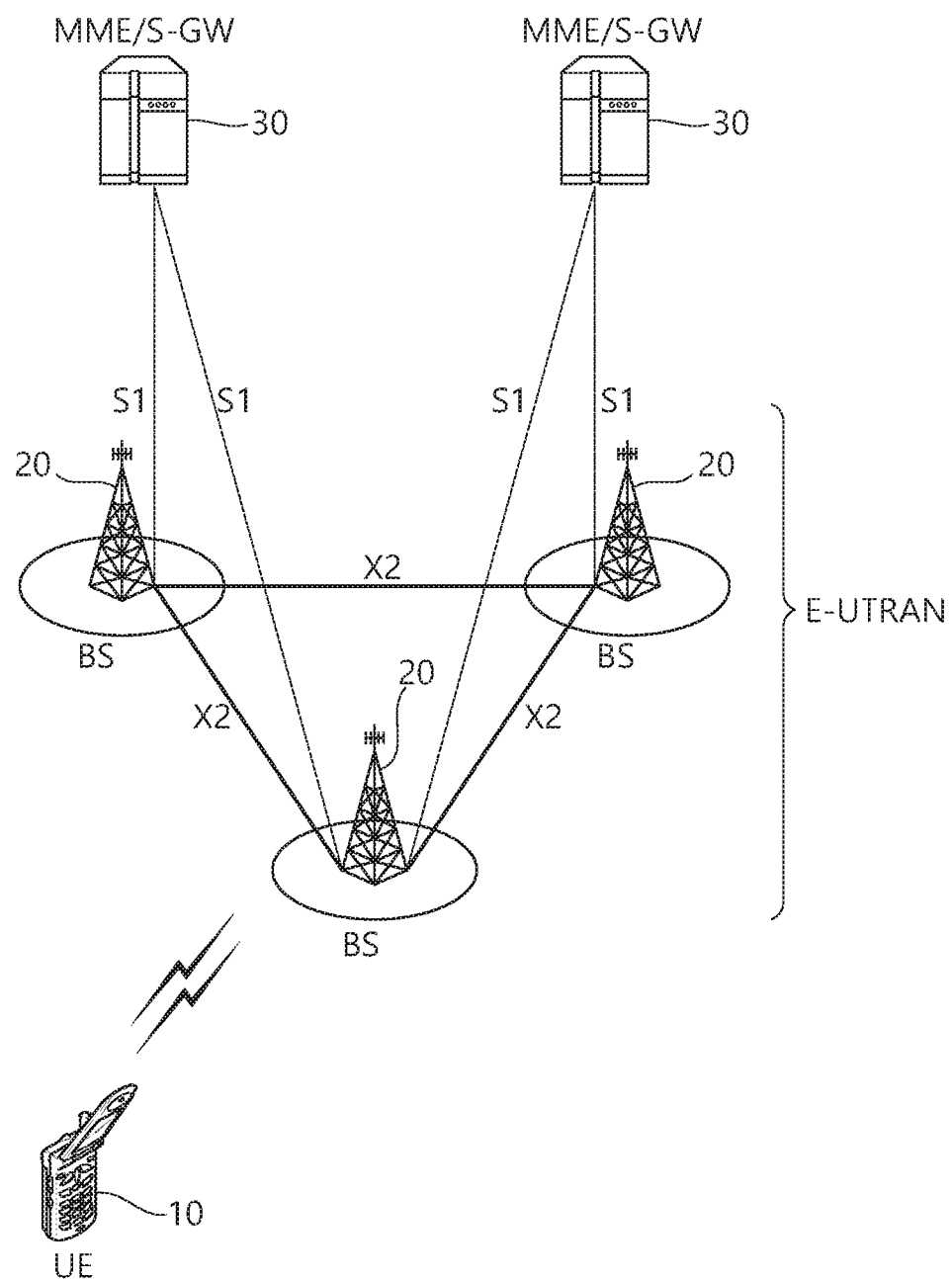
FIG. 1 shows LTE system architecture.

FIG. 1 shows architecture of an LTE system. Communication networks are widely deployed to provide a variety of communication services, such as voice over internet protocol (VoIP), through an IMS and packet data.

Referring to FIG. 1, the architecture of an LTE system includes one or more pieces of user equipment (UE) 10, an evolved-UMTS terrestrial radio access network (E-UTRAN), and an evolved packet core (EPC). The UE 10 refers to communication equipment carried by a user. The UE 10 may be fixed or mobile, and may be called another terminology, such as a mobile station (MS), a user terminal (UT), a subscriber station (SS) or a wireless device.

The E-UTRAN includes one or more evolved node-Bs (eNBs) 20, and a plurality of pieces of UE may be located in one cell. The eNB 20 provides the end points of a control plane and a user plane to the UE 10. In general, the eNB 20 is a fixed station that communicates with the UE 10 and may be called another terminology, such as a base station (BS), a base transceiver system (BTS) or an access point. A single eNB 20 may be deployed in a single cell. One or more cells may be present in coverage of the eNB 20. A single cell is configured to have one of bandwidths selected from 1.25, 2.5, 5, 10, and 20 MHz, and it provides downlink or uplink transmission services to several pieces of UE. In this case, different cells may be configured to provide different bandwidths.

Hereinafter, downlink (DL) refers to communication from the eNB 20 to the UE 10, and uplink (UL) refers to communication from the UE 10 to the eNB 20. In DL, a transmitter may be part of the eNB 20, and a receiver may be part of the UE 10. In UL, a transmitter may be part of the UE 10, and a receiver may be part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions, including non-access stratum (NAS) signaling to the eNBs 20, NAS signaling security, access stratum (AS) security control, Inter core network (CN) node signaling for mobility between 3GPP access networks, idle mode UE reachability (including control and execution of paging retransmission), tracking area list management (for UE in an idle or active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity, the MME/S-GW 30 will be simply called a "gateway" hereinafter, but it is understood that this entity includes both the MME and the S-GW.

Interfaces for transmitting user traffic or control traffic may be used. The UE 10 and the eNB 20 are connected through a Uu interface. The eNBs 20 are interconnected through an X2 interface. Adjacent eNBs may have a meshed network structure including the X2 interface. The eNBs 20 are connected to the EPC through an S1 interface. The eNBs 20 are connected to the MME through an S1-MME interface, and are connected to the S-GW through S1-U interface. The S1 interface supports a many-to-many relation between the eNB 20 and the MME/S-GW.

The eNB 20 may perform the functions of selection for the gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in the LTE_ACTIVE state. In the EPC, and as noted above, the gateway 30 may perform the functions of paging origination, LTE_IDLE state management, the ciphering of a user plane, SAE bearer control, and the ciphering and integrity protection of NAS signaling.

Figure 2:
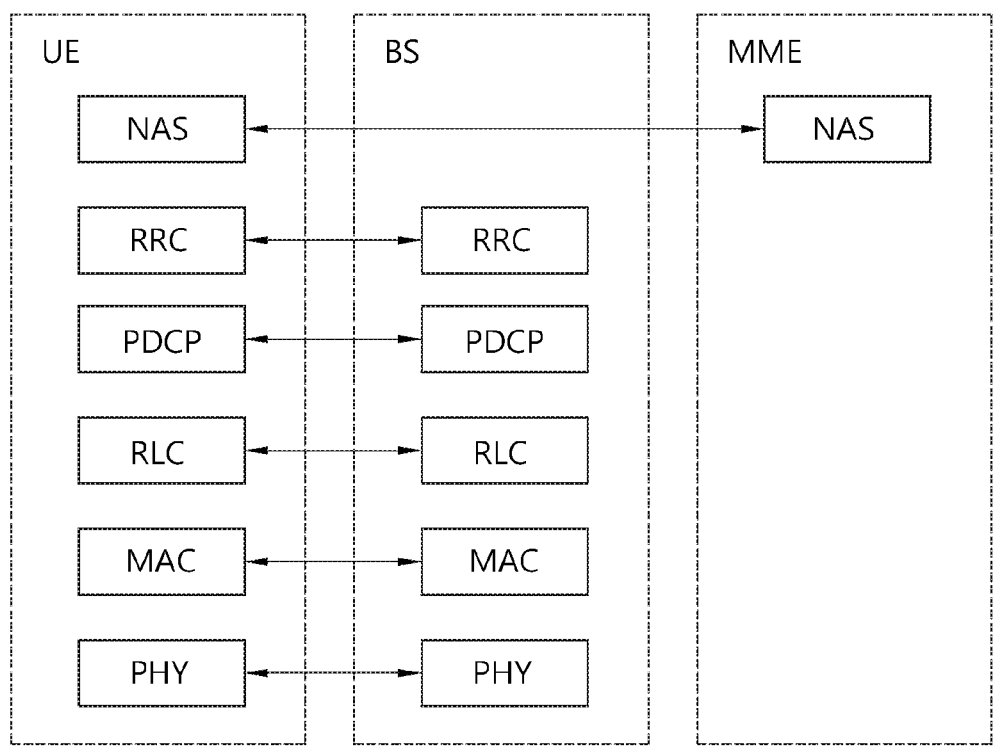
FIG. 2 shows a block diagram of a control plane protocol stack of an LTE system.
Figure 3:
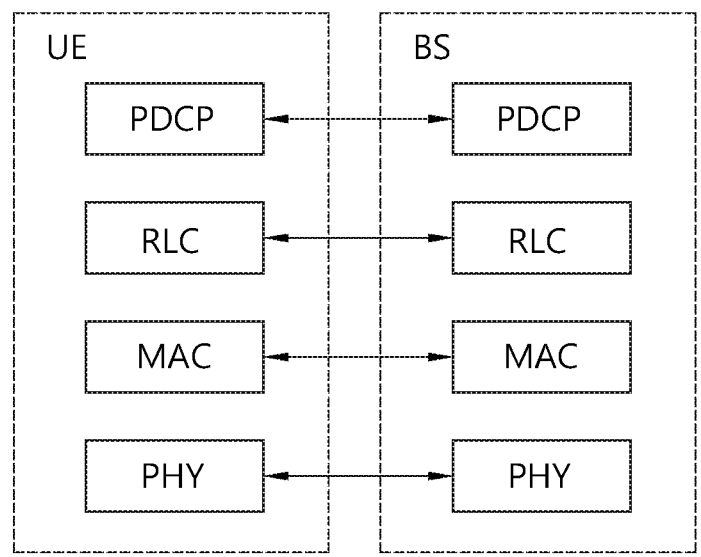
FIG. 3 shows a block diagram of a user plane protocol stack of an LTE system.

FIG. 2 shows the control plane of a radio interface protocol for an LTE system. FIG. 3 shows the user plane of a radio interface protocol for an LTE system.

The layers of a radio interface protocol between UE and an E-UTRAN may be classified into a first layer (L1), a second layer (L2), and a third layer (L3) based on the lower three layers of an open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states, such as an RRC connected state and an RRC idle state. When an RRC connection is established between the RRC layer of UE and the RRC layer of the E-UTRAN, the UE is in the RRC_CONNECTED state, and otherwise the UE is in the RRC_IDLE state. Since the UE in the RRC_CONNECTED state has the RRC connection established with the E-UTRAN, the E-UTRAN may recognize the existence of the UE in the RRC_CONNECTED state and may effectively control the UE. The UE in the RRC_IDLE state may not be recognized by the E-UTRAN, and a CN manages the UE in unit of a TA which is a larger area than a cell. That is, only the existence of the UE in the RRC_IDLE state is recognized in unit of a large area, and the UE must transition to the RRC_CONNECTED state to receive a typical mobile communication service such as voice or data communication.

In the RRC_IDLE state, the UE may receive the broadcasting of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Furthermore, in the RRC_IDLE state, no RRC context is stored in the eNB.

In the RRC_CONNECTED state, the UE has an E-UTRAN RRC connection and a context in the E-UTRAN, such that transmitting and/or receiving data to/from the eNB becomes possible. Furthermore, the UE may report channel quality information and feedback information to the eNB. In the RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighboring cell.

In the RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When a user initially powers on UE, the UE first searches for a proper cell and then remains in the RRC_IDLE state in the cell. When there is a need to establish an RRC connection, the UE in the RRC_IDLE state establishes an RRC connection with the E-UTRAN through an RRC connection procedure and then may switch to the RRC_CONNECTED state. The UE in the RRC_IDLE state may need to establish an RRC connection with the E-UTRAN when it requires uplink data transmission due to a user's call attempt or when it wants to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, that is, an EPS connection management (ECM)-IDLE state and an ECM-CONNECTED state. The two states apply to UE and an MME. When UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information about the UE. Therefore, the UE in the ECM-IDLE state performs a UE-based mobility-related procedure, such as cell selection or reselection, without having to receive a command from a network. In contrast, when the UE is in the ECM-CONNECTED state, the mobility of the UE is managed by a command from a network. If the location of the UE in the ECM-IDLE state is different from that known to the network, the UE announces its location to the network through a tracking area update procedure.

Figure 4:
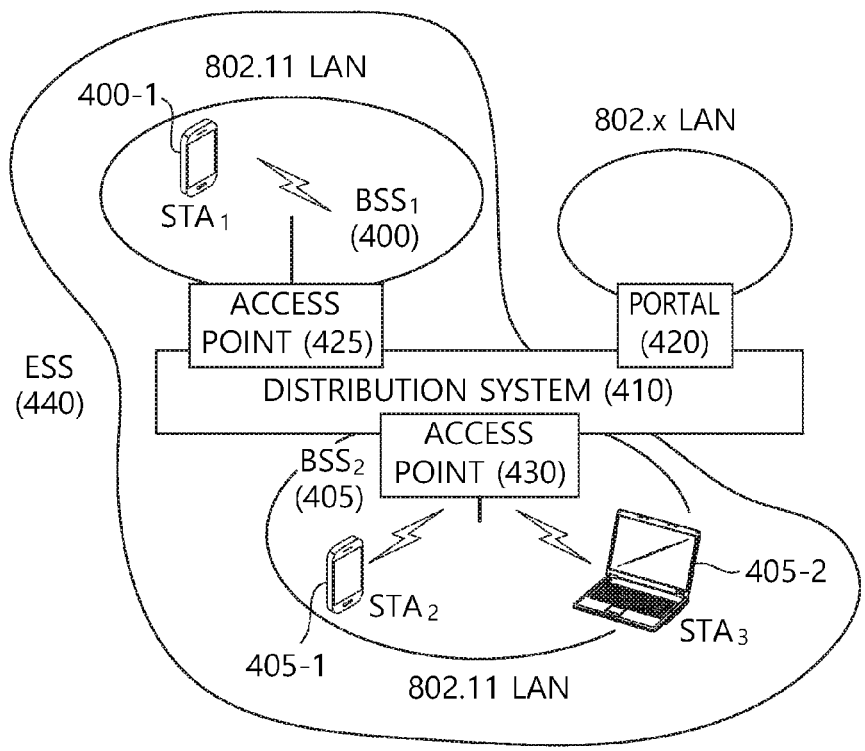
FIG. 4 is a conceptual view illustrating a structure of a wireless local area network (WLAN).
Figure 4:
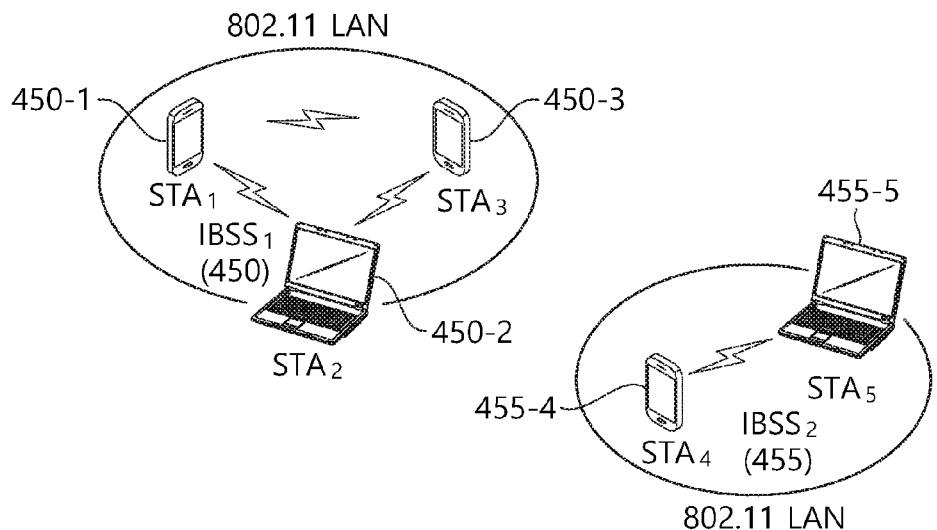

FIG. 4 is a conceptual view illustrating a structure of a wireless local area network (WLAN). FIG. 4(*a*) shows the structure of the IEEE (institute of electrical and electronic engineers) 802.11 infrastructure network. FIG. 4(*b*) is a concept view illustrating an independent BSS.

Referring to the upper part of FIG. 1, the WLAN system may include one or more basic service sets (BSSs) 400 and 405. The BSS 400 or 405 is a set of an access point (AP), such as an AP 425, and a station (STA), such as an STA1 400-1, which may have been successfully synchronized to communicate with each other. The BSS is not a concept to indicate a particular area. The BSS 405 may include one AP 430 and one or more STAs 405-1 and 405-2 connectable to the AP 430.

The infrastructure BSS may include at least one STA, APs 425 and 430 providing a distribution service, and a distribution system (DS) 410 connecting multiple APs.

The distribution system 410 may implement an extended service set (ESS) 440 by connecting a number of BSSs 400 and 405. The ESS 440 may be used as a term to denote one network configured of one or more APs 425 and 430 connected via the distribution system 410. The APs included in one ESS 440 may have the same SSID (service set identification).

The portal 420 may function as a bridge that performs connection of the WLAN network (IEEE 802.11) with other network (for example, 802.X).

In the infrastructure network as shown in the FIG. 4(*a*), a network between the APs 425 and 430 and a network between the APs 425 and 430 and the STAs 400-1, 405-1, and 405-2 may be implemented. However, without the APs 425 and 430, a network may be established between the STAs to perform communication. The network that is established between the STAs without the APs 425 and 430 to perform communication is defined as an ad-hoc network or an independent BSS.

Referring to FIG. 4(*b*), the independent BSS (IBSS) is a BSS operating in ad-hoc mode. The IBSS does not include an AP, so that it lacks a centralized management entity. In other words, in the IBSS, the STAs 450-1, 450-2, 450-3, 455-4 and 455-5 are managed in a distributed manner. In the IBSS, all of the STAs 450-1, 450-2, 450-3, 455-4 and 455-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP STA (station).

The STA may be also called various terms, such as a mobile terminal, a wireless device, a wireless transmit/receive unit (WTRU), user equipment (UE), a mobile station (MS), a mobile subscriber unit or simply a user.

Figure 5:
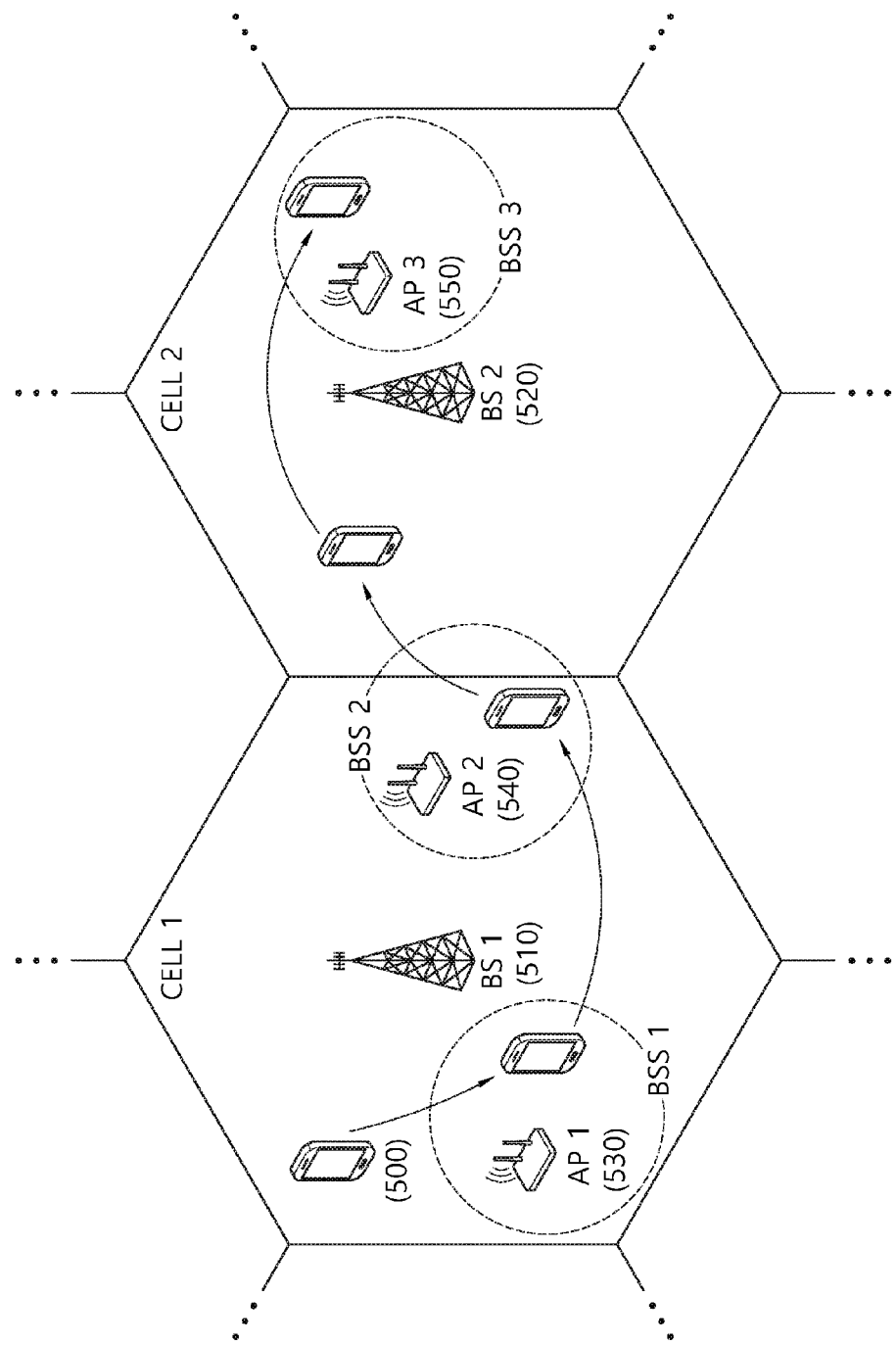
FIG. 5 is a diagram illustrating an example of an environment in which 3GPP access networks and WLAN access networks coexist.

FIG. 5 is a diagram illustrating an example of an environment in which 3GPP access networks and WLAN access networks coexist.

Referring to FIG. 5, as 3GPP access networks, a cell 1 is deployed around a BS 1 510, and a cell 2 is deployed around a BS 2 520. Furthermore, as WLAN access networks, a basic service set (BSS) 1 is deployed around an AP1 530, a BSS 2 is deployed around an AP2 540, and a BSS 3 is deployed around an AP3 550 within the cell 2. Coverage of the cells is indicated by solid lines, and coverage of the BSSs is indicated by dotted lines.

It is assumed that UE 500 is configured to perform communication over a 3GPP access network or a WLAN access network. In this case, the UE 500 may be called a station.

Initially, the UE 500 may establish a connection with the BS 1 510 within the cell 1 and handle traffic over a 3GPP access network.

The UE 500 may enter coverage of the BSS1 while moving in coverage of cell 1 and discover the BSS1 through scanning. In this case, the UE 500 may be connected with the WLAN access network by performing association and authentication procedures with the AP1 530 of the BSS1. As a result, the UE 500 may process traffic over the 3GPP access network and the WLAN access network. When the UE 500 deviates from the coverage of the BSS1, the connection with the WLAN access network may be terminated.

The UE 500 continues to move in the coverage of the cell 1, moves to the vicinity of a boundary between the cell 1 and the cell 2, enters the coverage of the BSS2, and discovers the BSS2 through scanning. In this case, the UE 500 may be connected with the WLAN access network by performing the association and authentication procedures with the AP2 540 of the BSS2. Since the UE 500 in the coverage of the BSS2 is positioned on the boundary of the cell 1 and the cell 2, service quality over the 3GPP access network may not be excellent. In this case, the UE 500 may operate to concentratively process traffic over the WLAN access network.

When the UE 500 moves to deviate from the coverage of the BSS2 and enters the center of the cell 2, the UE 500 may terminate the connection with the WLAN access network and process the traffic over the 3GPP access network based on the cell 2.

The UE 500 may enter the coverage of the BSS3, while moving in the coverage of cell 2, and discover the BSS1 through scanning. In this case, the UE 500 may be connected with the WLAN access network by performing the association and authentication procedures with the AP3 550 of the BSS3. As a result, the UE 500 may process traffic over the 3GPP access network and the WLAN access network.

As described in the example of FIG. 5, under a wireless communication environment in which the 3GPP access network and the non-3GPP access network coexist, the terminal may adaptively process the traffic over the 3GPP access network and/or the non-3GPP access network.

In relation to a technology for interworking between a 3GPP access network and a non-3GPP access network, an LTE-WLAN aggregation (LWA), RAN controlled LTE-WLAN interworking (RCLWI), and an LTE/WLAN radio level integration with IPsec tunnel (LWIP) have been newly introduced in the 3GPP Release 13 for traffic steering between LTE and a WLAN. The technologies are described in detail below.

Figure 6:
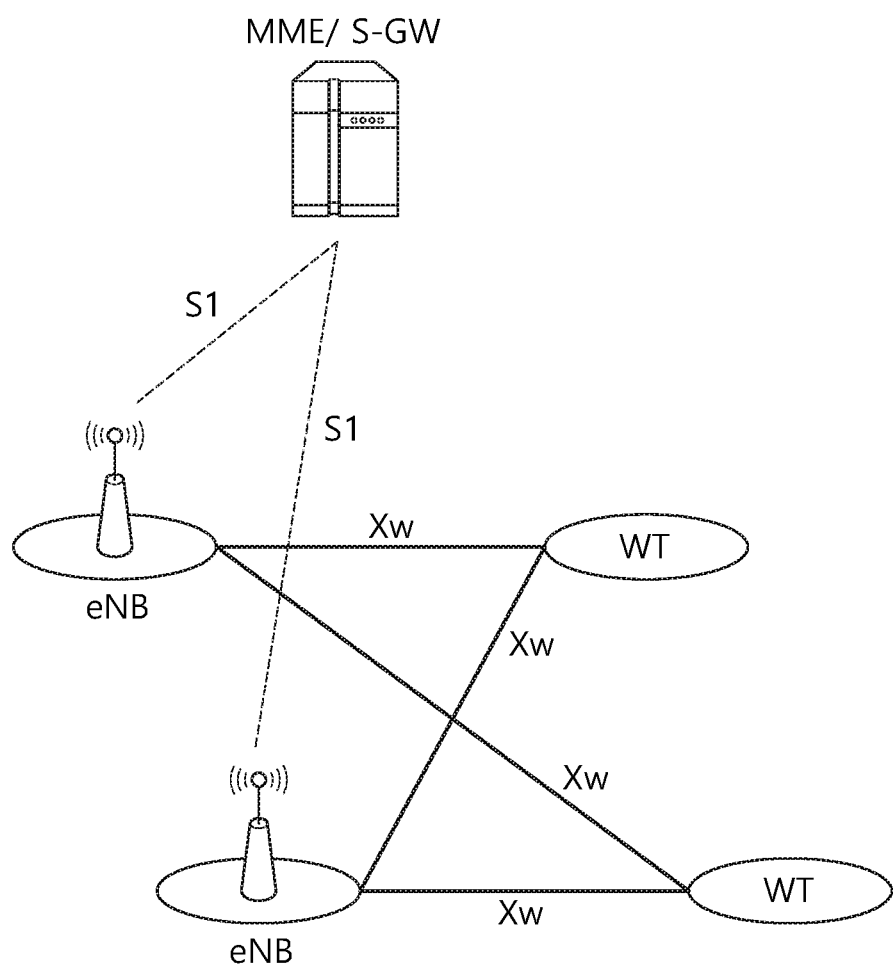
FIG. 6 shows overall architecture of an LTE-WLAN aggregation (LWA) and RAN-controlled LTE WLAN interworking (RCWLI).

First, the LWA is described below. An E-UTRAN may support an LTE-WLAN aggregation (LWA) operation. That is, a terminal in the RRC connected state is configured by an eNB so that it uses the radio resources of LTE and a WLAN. Two scenarios may be supported depending on a backhaul connection between LTE and a WLAN: 1) a non-collocated LWA scenario for a non-ideal backhaul and 2) a collocated LWA scenario for an ideal/internal backhaul. FIG. 6 shows overall architecture of a non-collocated LWA scenario. WLAN termination (WT) may be disposed at the end of a WLAN through an Xw interface. More specifically, an E-UTRAN may configure a terminal so that the terminal accesses a WLAN and configures a bearer for the LWA (an LWA bearer or LWA DRB) under the LWA. The terminal may perform WLAN measurement and a WLAN change using WLAN parameters received from the E-UTRAN.

The following is a description of RAN controlled WLAN interworking (RCLWI). An E-UTRAN supports E-UTRAN controlled bi-directional traffic steering between the E-UTRAN and a WLAN for UE in the RRC_CONNECTED state: (RCLWI). The E-UTRAN may send a steering command, to the UE, that instructs to steer traffic from the E-UTRAN to the WLAN or from the WLAN to the E-UTRAN. The upper layers in the UE shall be notified upon reception of such a command. The upper layers determine which traffic is offloadable to the WLAN. Similarly as for the LWA, two scenarios are supported depending on a backhaul connection between LTE and a WLAN (i.e., a non-collocated RCLWI scenario for a non-ideal backhaul and a collocated RCLWI scenario for an ideal/internal backhaul), and overall architecture for the non-collocated RCLWI scenario is the same as that for the LWA in FIG. 6.

The following is a description of the LWIP. The LWIP allows UE in the RRC_CONNECTED state to be configured by an eNB so that the UE utilizes WLAN radio resources via IPsec tunneling.

Figure 7:
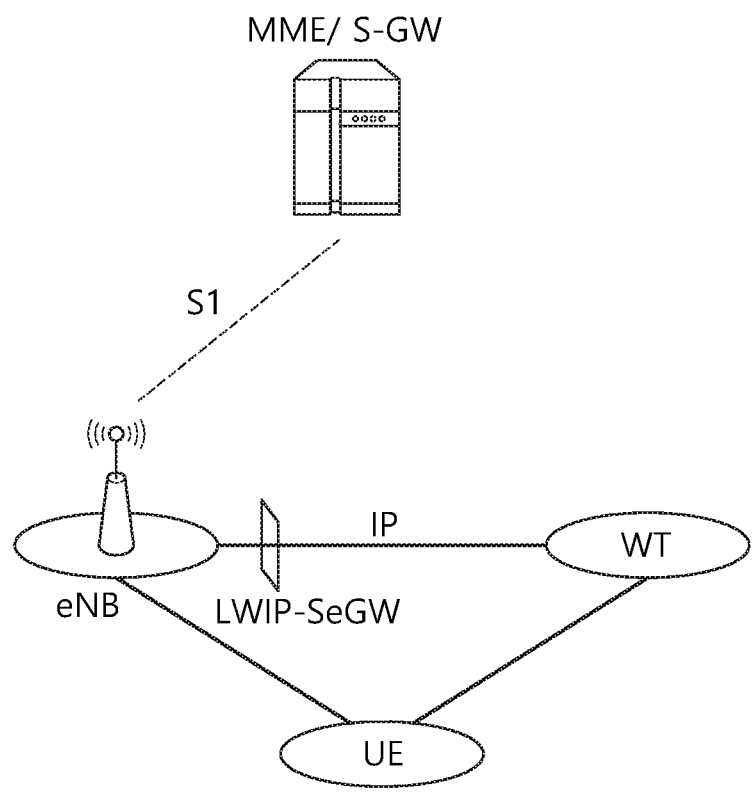
FIG. 7 shows overall architecture of an LTE/WLAN radio level integration with IPsec tunnel (LWIP).

FIG. 7 illustrates overall architecture of the LWIP. Referring to FIG. 7, connectivity between an eNB and a WLAN is over an IP. The IP packets transferred between UE and an LWIP-SeGW are encapsulated using IPsec in order to provide security to the packets that traverse the WLAN. The IP packets are then transported between the LWIP-SeGW and the eNB. An end to end path between the UE and the eNB over the WLAN network is called an LWIP tunnel.

WLAN measurement is described below.

A terminal which supports the LTE-WLAN aggregation (LWA) may be configured by an E-UTRAN so that it performs WLAN measurement. An object of WLAN measurement may be set using a WLAN identifier (e.g., a BSSID, an HESSID and an SSID), a WLAN channel number and a WLAN band. A WLAN measurement report may be triggered using an RSSI. A WLAN measurement report may include an RSSI, channel utilization, a station count, an admission capacity, a backhaul rate, and a WLAN identifier. WLAN measurement may be configured to support at least any one of LWA activation, inter WLAN mobility set mobility and LWA deactivation.

Figure 8:
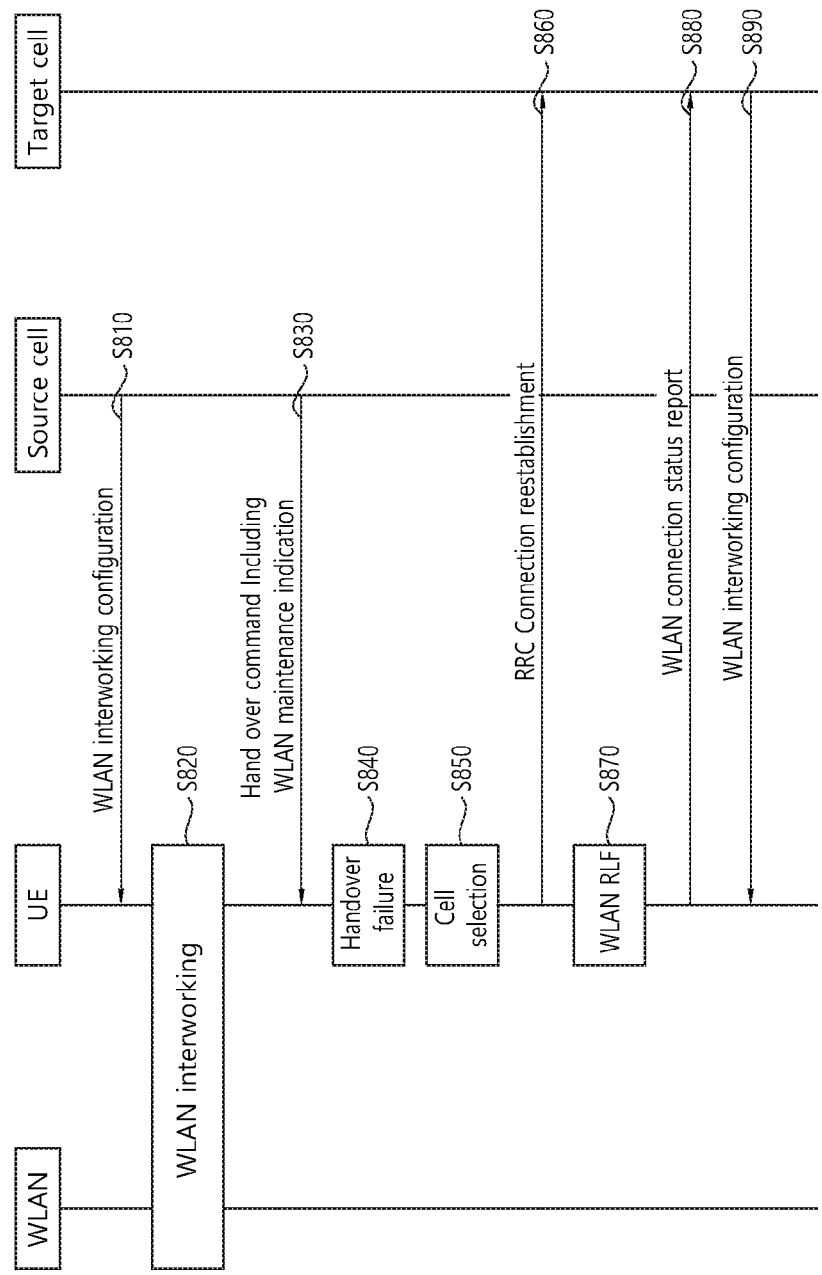
FIG. 8 is a flowchart for illustrating a process of performing, by a terminal in a WLAN interworking operation, handover in accordance with an embodiment of the present invention.

FIG. 8 is a flowchart for illustrating a process of performing, by a terminal in a WLAN interworking operation, handover in accordance with an embodiment of the present invention.

(1) Referring to FIG. 8, UE may receive WLAN interworking configuration information from a source cell (S810). In the present embodiment, the source cell is a cell that is now connected to the UE, and may be included in coverage formed by an eNB. Furthermore, the source cell may be a cell which transmits a handover command to the UE under a specific condition. The WLAN interworking configuration information may include information about a WLAN mobility set. The WLAN mobility set may be information about WLAN AP identities. Furthermore, the WLAN interworking configuration information may include traffic to be offloaded to a WLAN.

(2) The UE may access a WLAN using the received WLAN interworking configuration information and perform a WLAN interworking operation (S820). In accordance with an embodiment, the WLAN interworking configuration may be any one of the LTE-WLAN aggregation (LWA), the RAN controlled LTE-WLAN interworking (RCLWI) configuration and the LTE/WLAN radio level integration with IPsec tunnel (LWIP) configuration.

(3) The UE may receive a handover command from the source cell to a target cell (S830). The target cell is a cell that is to be newly accessed by the UE through handover, and may be present in the same coverage of an eNB as the source cell or may be present in coverage of an eNB different from that of the source cell. The source cell and the target cell have been simply functionally classified from the same cell. That is, if the same cell is now connected to the UE, it may be classified as a source cell. If a cell is an object to be connected to the UE through handover, the corresponding cell may be classified as a target cell. The handover command is a command that instructs the UE to perform handover from the source cell to the target cell. For example, the handover command may be an RRC connection reconfiguration command including mobility control information. When the UE receives the handover command, it may attempt handover to the target cell.

In accordance with an embodiment, the handover command may include a WLAN interworking configuration indication to indicate that the UE should maintain or release a WLAN interworking configuration with respect to a WLAN that is now accessed when the UE performs handover. The WLAN interworking configuration indication may be an indication to instruct the UE should maintain or release a connection with a currently accessed WLAN when the UE performs a handover operation. For convenience of description, if the WLAN interworking configuration indication indicates that the WLAN interworking configuration should be maintained, this may be called a WLAN interworking maintenance indication. To maintain the WLAN interworking configuration means that the UE stores the WLAN interworking configuration information retained therein and maintains a connection with the WLAN based on the stored WLAN configuration information. For example, the WLAN interworking configuration indication may include contents that indicate the execution of handover while maintaining an LWA configuration (i.e., keep-LWA-configuration), contents that indicate the execution of handover while maintaining access to a WLAN that is now accessed in the same WLAN termination (WT) (i.e., contents indicating the UE to not change the WT) and so on. The WLAN with which the UE maintains a connection has only to be any one of a mobility set that is now accessed, and thus a WLAN does not need to be necessarily a WLAN itself that is now accessed. As described above, when the UE receives the handover command including the WLAN interworking maintenance indication, the UE may attempt handover to the target cell in the state in which it has maintained the WLAN interworking configuration.

The WLAN interworking configuration indication included in the handover command may instruct that the WLAN interworking configuration should be released. If the UE receives a handover command including a WLAN interworking configuration indication to indicate that a WLAN interworking configuration should be released, the UE may attempt handover to the target cell in the state in which the UE has released a connection with a WLAN that is now accessed.

(4) If a result of the handover fails, the UE may search for a cell for RRC connection re-establishment and select any one of retrieved cells as a cell for RRC connection re-establishment (S840). If a result of the handover fails, this means that one or more of a series of processes of performing, by the UE, the handover from the source cell to the target cell have not been normally performed. For example, if a radio link failure (RLF) related to the wireless communication of the UE is generated while the UE performs handover, the corresponding handover may fail.

(5) If, as a result of the search for a cell for RRC connection re-establishment, a retrieved cell is the source cell or the target cell, the UE may perform an RRC connection re-establishment procedure on the cell that has been searched for in the state in which the UE has maintained the WLAN interworking configuration (S860). That is, although the handover has failed, the UE may maintain the stored WLAN interworking configuration information without any change. More specifically, the UE may perform an RRC connection re-establishment procedure by transmitting an RRC connection re-establishment request message to a retrieved cell and receiving an RRC connection re-establishment message from the retrieved cell.

In contrast, if a retrieved cell is not the source cell or the target cell, the UE may release the WLAN interworking configuration and initialize the RRC setup procedure. In this case, the UE may delete the stored WLAN interworking configuration information and release the connection with the WLAN. That is, if the retrieved cell is not the source cell or the target cell, the UE may enter the RRC_IDLE state and initialize the RRC connection establishment procedure.

In accordance with an embodiment, it is to be noted that if offloading is configured in the UE while a timer T350 operates, the UE may select/reselect a cell other than a primary cell (PCell) or the target cell. In this case, the UE may stop the operation of the timer T350.

(6) If the handover or the RRC connection re-establishment procedure is completed, an RLF may also be generated between the UE and the WLAN (S870). That is, an RLF may be generated on the WLAN side. Accordingly, when the handover or the RRC connection re-establishment procedure is completed, it is necessary for the UE to check a current coupling status with the WLAN.

(7) Accordingly, after performing the handover, the UE may determine whether the WLAN interworking configuration is maintained, and may report a WLAN connection status, including information about whether the WLAN interworking configuration is maintained, to the target cell (S880). The WLAN connection status may be a success (i.e., the WLAN interworking configuration is maintained) or a failure. In accordance with an embodiment, the WLAN connection status may be transmitted through a WLAN connection status report message "WLANConnectionStatusReport message."

In an embodiment, the UE may report that a WLAN connection status, indicating that WLAN interworking normally operates after the handover, to the target cell. A process of measuring, by the UE, the WLAN connection status and reporting it to a serving cell is a known technology, and thus a detailed description thereof is omitted.

(8) If the WLAN connection status fails, that is, if the WLAN interworking configuration is indicated to have been released in the handover process, the UE may newly receive WLAN configuration information from the target cell (S890). In this case, the newly received WLAN interworking configuration information may be WLAN interworking configuration information regarding an existing WLAN that has been accessed, but may be WLAN interworking configuration information regarding a new WLAN different from an existing WLAN. Accordingly, the UE may perform a WLAN interworking operation even after handover is performed.

In this description, in order to help understanding, the WLAN connection status has been illustrated as being measured after the handover and the measured WLAN connection status has been illustrated as being transmitted to the target cell. It is however to be noted that a process of measuring and transmitting a WLAN connection status may be identically performed even after an RRC connection re-establishment procedure. In other words, after the UE is successful in accessing the target cell according to the handover procedure or the RRC connection re-establishment procedure, it may measure the WLAN connection status and report the measured WLAN connection status to the target cell.

In accordance with an embodiment of the present invention, when UE performs a handover procedure during a WLAN interworking operation, it maintains a WLAN interworking configuration. Accordingly, a WLAN offloading gain can be improved and an unnecessary RRC reconfiguration process after handover can be omitted.

Figure 9:
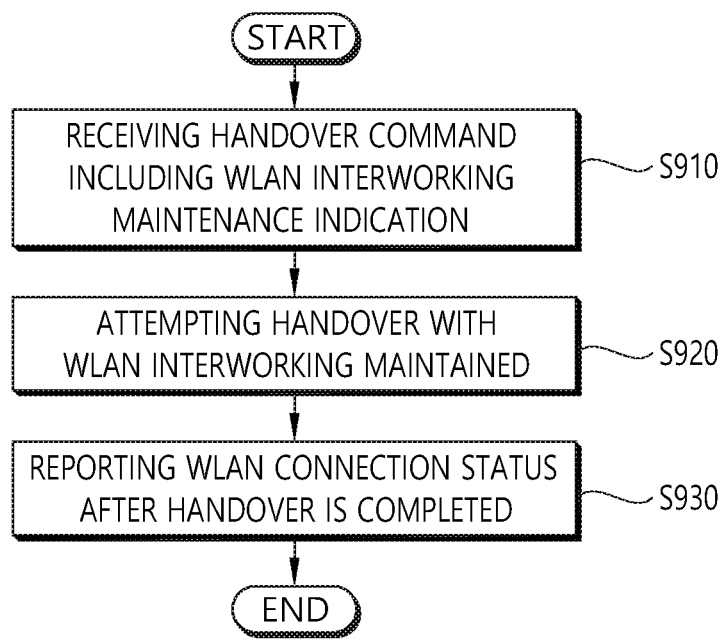
FIG. 9 shows a process of performing, by a terminal, handover in accordance with an embodiment of the present invention.

FIG. 9 shows a process of performing, by UE, handover in accordance with an embodiment of the present invention.

UE in accordance with an embodiment of the present invention is instructed to perform handover from a source cell to a target cell, but the UE may receive a handover command including a WLAN interworking configuration indication to indicate that the UE should maintain or release a WLAN interworking configuration for a WLAN to which the UE is accessed (S910). In this case, WLAN interworking may be any one of the LWA, RCLWI and LWIP.

If the WLAN interworking configuration indication included in the handover command indicates that the WLAN interworking configuration should be maintained, the UE may attempt to perform handover without releasing the accessed WLAN (S920). In this case, if a connection with the accessed WLAN is not released, this may mean that the UE maintains a WLAN configuration by retaining WLAN configuration information (e.g., an LWA configuration) stored in the UE without any change. Furthermore, if the UE performs handover without releasing the connection with the accessed WLAN, this means that the UE performs the handover without changing WLAN termination (WT) being accessed by the UE.

If the handover fails, the UE may search for a cell for RRC connection re-establishment. If, as a result of the search, a retrieved cell is the source cell or the target cell, the UE may perform an RRC connection re-establishment procedure on the cell that has been searched for in the state in which the UE has maintained the WLAN interworking configuration. In contrast, if the retrieved cell is not the source cell or the target cell, the UE may release the WLAN interworking configuration and initialize an RRC setup procedure. To release the RRC setup procedure means that the stored WLAN interworking configuration information is deleted.

After performing the handover, the UE may report a wireless local area network (WLAN) connection status, including information regarding whether the WLAN interworking configuration is maintained, to the target cell (S930). If the WLAN connection status indicates that the WLAN interworking configuration has been released in the handover process, the UE may newly receive WLAN interworking configuration information from the target cell. Thereafter, the UE may attempt access to a WLAN using the newly received WLAN interworking configuration information. In this case, the WLAN to be accessed may be a WLAN that had been accessed by the UE, but may be a new WLAN.

In the present embodiment, in order to help understanding, the WLAN connection status has been illustrated as being reported to the target cell after the handover is completed, but the present invention is not limited thereto. In some embodiments, the UE may perform an RRC connection re-establishment procedure and may report a WLAN connection status to a target cell even after accessing the target cell.

Figure 10:
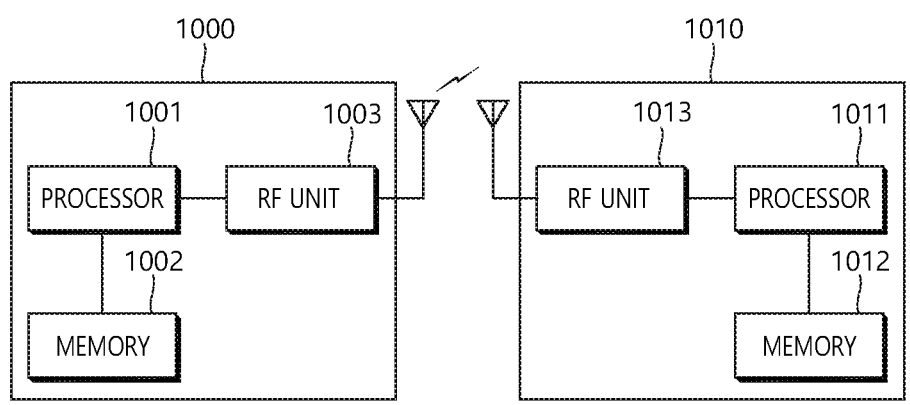
FIG. 10 shows a wireless communication system in which an embodiment of the present invention is implemented.

FIG. 10 is a block diagram illustrating a wireless apparatus in which an embodiment of the present invention may be implemented.

A BS 1000 includes a processor 1001, memory 1002, and a radio frequency (RF) unit 1003. The memory 1002 is coupled to the processor 1001 and stores a variety of pieces of information for driving the processor 1001. The RF unit 1003 is coupled to the processor 1001 and transmits and/or receives a radio signal. The processor 1001 implements the proposed functions, procedures and/or methods. In the aforementioned embodiments, the operation of the BS may be implemented by the processor 1001.

UE 1010 includes a processor 1011, memory 1012, and an RF unit 1013. The memory 1012 is coupled to the processor 1011 and stores a variety of pieces of information for driving the processor 1011. The RF unit 1013 is coupled to the processor 1011 and transmits and/or receives a radio signal. The processor 61 implements the proposed functions, procedures and/or methods. In the aforementioned embodiments, the operation of the UE 1010 may be implemented by the processor 1011.

The processors 1011 may include application-specific integrated circuits (ASIC), other chipsets, logic circuits and/or data processors. The memory may include read-only memory (ROM), random access memory (RAM), flash memory, a memory card, a storage medium and/or other storage devices. The RF unit may include a baseband circuitry for processing a radio frequency signal. When the embodiments are implemented in software, the techniques described herein may be implemented using modules (e.g., procedures and/or functions) that perform the functions described herein. The modules may be stored in the memory and executed by the processor. The memory may be implemented by the processor or may be external to the processor in which case those may be communicatively coupled to the processor via various means as is known in the art.

In view of the exemplary systems described herein, the methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing, by a terminal, a handover procedure in a wireless communication system, the method comprising:
   receiving a handover command which comprises a WLAN interworking configuration indication to indicate whether the terminal maintains a wireless local area network (WLAN) interworking configuration during the handover procedure; and
   performing the handover procedure from a cellular source cell to a cellular target cell according to the handover command while maintaining the WLAN interworking configuration, if the WLAN interworking configuration indication indicates that the terminal maintains the WLAN interworking configuration.

2. The method of claim 1, wherein the WLAN interworking configuration comprises any one of an LTE-WLAN aggregation (LWA) configuration, an RAN controlled LTE-WLAN interworking (RCLWI) configuration, and an LTE/WLAN radio level integration with IPsec tunnel (LWIP) configuration.

3. The method of claim 1, further comprising searching for a cell for RRC connection re-establishment if the handover procedure fails.

4. The method of claim 3, further comprising performing an RRC connection re-establishment procedure on a retrieved cell searched for in a state in which the terminal has maintained the WLAN interworking configuration if, as a result of the search for the cell for RRC connection re-establishment, the retrieved cell is the cellular source cell or the cellular target cell.

5. The method of claim 3, further comprising releasing the WLAN interworking configuration and initializing an RRC setup procedure if, as a result of the search for the cell, a retrieved cell is not the cellular source cell or the cellular target cell.

6. The method of claim 1, further comprising reporting a WLAN connection status comprising whether the WLAN interworking configuration has been maintained to the cellular target cell after the handover procedure is performed.

7. The method of claim 6, further comprising newly receiving WLAN interworking configuration information from the cellular target cell if the WLAN connection status indicates that the WLAN interworking configuration has been released in the handover procedure.

8. The method of claim 1, wherein the performing the handover procedure comprises attempting to perform the handover procedure to the cellular target cell in a state in which the WLAN interworking configuration has been released if the WLAN interworking configuration indication indicates that the WLAN interworking configuration has been released.

9. A terminal for performing a handover procedure in a wireless communication system, the terminal comprising:
   memory;
   a transceiver; and
   a processor connecting the memory and the transceiver, wherein the processor performs control so that the terminal receives a handover command which comprises a WLAN interworking configuration indication to indicate whether the terminal maintains a wireless local area network (WLAN) interworking configuration during the handover procedure, and that the terminal performs the handover procedure from a cellular source cell to a cellular target cell according to the handover command while maintaining the WLAN interworking configuration, if the WLAN interworking configuration indication indicates that the terminal maintains the WLAN interworking configuration.

10. The terminal of claim 9, wherein the terminal searches for a cell for RRC connection re-establishment if the handover procedure fails.

11. The terminal of claim 10, wherein the terminal performs an RRC connection re-establishment procedure on a retrieved cell searched for in a state in which the terminal has maintained the WLAN interworking configuration if, as a result of the search for the cell for RRC connection re-establishment, the retrieved cell is the cellular source cell or the cellular target cell.

12. The terminal of claim 10, wherein the terminal releases the WLAN interworking configuration and initializes an RRC setup procedure if, as a result of the search for the cell, a retrieved cell is not the cellular source cell or the cellular target cell.

13. The terminal of claim 9, wherein the terminal reports a WLAN connection status comprising whether the WLAN interworking configuration has been maintained to the cellular target cell after the handover procedure is performed.

14. The terminal of claim 13, wherein the terminal newly receives WLAN interworking configuration information from the cellular target cell if the WLAN connection status indicates that the WLAN interworking configuration has been released in the handover procedure.

* * * * *